Patented Oct. 24, 1944

2,361,027

UNITED STATES PATENT OFFICE 2,361,027

DRYING COMPOSITIONS

Virgil L. Hansley, Niagara Falls, and Arthur O. Rogers, Lewiston, N. Y., assignors to E. I. du Pont de Nemours & Company, Wilmington, Del., a corporation of Delaware No Drawing. Application May 19, 1941, Serial No. 394,162

23 Claims. (Cl. 106—264)

This invention relates to drying compositions and more particularly to drying compositions derived from certain aliphatic esters.

There is no disclosure in the prior art concerning the drying compositions of the present invention. While the drying properties of certain naturally occurring oils such as linseed, tung, and certain fish oils have long been known, drying compositions of the type obtained in accordance with the present invention are new and in some instances outstandingly superior to any drying oils heretofore known.

One of the objects of this invention is to provide new and useful drying compositions. A further object is to provide drying compositions which have extremely rapid drying rates and other superior and outstanding properties. Another object of the invention is to provide a novel process and products derived therefrom. Other objects will be apparent from the ensuing description of our invention.

The above objects are obtained in accordance with our invention by the condensation of certain esters of aliphatic acids. The esters which we have found to condense in accordance with the present invention are esters of aliphatic acids having at least one olefinic bond in the acid radical. We have found that these esters may be condensed either with themselves or with esters of saturated aliphatic acids it being essential that one of the esters undergoing condensation have at least two hydrogen atoms on the carbon atom adjacent the carbonyl group. The condensation is carried out in the presence of suitable condensing agents and the condensation products obtained have drying properties similar to and in some cases greatly superior to those of natural drying oils.

Illustrative of the esters of unsaturated acids which we have found suitable for use in accordance with our invention are esters of acids such as vinyl acetic, oleic, erucic, elaidic, brassidic, linoleic, linolenic, eleostearic, and clupanodonic acid. Any esters of such aliphatic unsaturated acids and monohydric alcohols may be condensed in accordance with our invention. For instance, esters of alcohols such as methyl, ethyl, octyl, allyl, vinyl, stearyl crotyl, cyclohexyl and geranyl; benzyl, cresyl, salicyl, and vanillyl; furyl and tetrahydrofuryl; and esters of various other alcohols are included within the scope of our invention.

Furthermore, esters of these unsaturated acids condense with the esters of saturated acids in accordance with our invention and any saturated ester derived from a monohydric alcohol may be utilized in this manner provided at least one of the esters being condensed has at least two hydrogen atoms on the carbon atom adjacent the carbonyl group. Esters which we have found to be particularly suitable are the esters derived from the glycerides of naturally occurring oils such as tung oil, and certain fish oils such as menhaden or sardine oils by an ester interchange reaction. We have found the mixture of esters obtainable from tung, menhaden, or sardine oils, by an ester interchange reaction entirely suitable in our novel condensation. Although the condensation products of these mixtures of esters may contain various products in addition to the unsaturated beta-keto esters we have discovered that these mixtures are entirely satisfactory and useful compositions having good drying properties. For example, lower alcohols such as methyl alcohol may be reacted with tung oil in a known manner in the presence of an ester interchange catalyst such as a sodium alcoholate to obtain a suitable ester, or such esters may be obtained by esterification of the corresponding acids.

The esters comprising our novel drying compositions are generally prepared by heating the above described esters, in the presence or absence of an inert diluent, with a suitable condensing agent, for instance sodium hydride or sodium methylate, until conversion to the sodium derivative of the beta-keto-ester is substantially complete. The reaction mixture is then acidified and washed free of salt, acid and other soluble impurities; the water and diluent are removed by distillation; and the desired product is recovered as a residue.

The condensing agents which we have found suitable in the operation of our invention include all known agents for the Claisen type of condensation such as sodium, sodium hydride, sodamide, sodium alcoholates, and triphenyl methyl sodium. In place of sodium and the named sodium compounds, we may use the other alkali metals or the corresponding compounds of other alkali metals. Alkaline earth metal hydrides such as calcium hydride previously known for the Claisen type of condensation are also included within the scope of our invention. We prefer to utilize sodium hydride as the condensing agent since this compound is readily available in a form convenient for use. Furthermore, when sodium hydride is utilized as the condensing agent we have observed that there is less tendency towards side reactions and high yields are generally obtained.

Our novel condensation may be carried out at various temperatures. We have found that temperatures of from 100–150° C. are generally satisfactory. However, the optimum temperature to be utilized in carrying out any particular condensation will depend upon the particular esters used. Generally, we prefer to use equimolecular amounts of the ester and condensing agent although this is not essential to the successful operation of our invention.

While the unsaturated beta-keto-esters of our invention have been found generally to possess drying properties and the esters derived from tung and fish oils have particularly desirable drying properties, we have further discovered that the most valuable products obtained in the case of fish oils are obtained by first fractionating the mixture of esters obtained by alcoholysis of the original glycerides and utilizing the higher boiling fractions thereof. While the lower fractions of these esters are suitable for use in our novel condensation reaction, we have found it desirable, in order to obtain drying compositions having the best drying properties, to utilize only these higher boiling fractions.

We have observed that the unsaturated beta-keto-esters obtained in accordance with our invention undergo ketonic hydrolysis as would be expected in the case of compounds of this type. We have found that the ketonic hydrolysis products also possess useful drying properties and such products are included within the scope of our invention.

We have further discovered that our novel condensation products readily form sodium derivatives which may be reacted with halogens or with organic halogen compounds and the products of such reaction have also been found to possess drying properties. Such reaction products usually possess drying properties superior to those of the unsaturated beta-keto-esters utilized in their preparation.

The following examples illustrate our invention.

EXAMPLE 1

Tung oil (0.5 mole) was mixed with a solution of sodium methylate (0.2 mole) in methanol (1.6 mole) and the solution boiled for ten minutes. The product was cooled, acidified with hydrochloric acid and washed with water until neutral. The resulting mixture of methyl esters (principally methyl eleostearate) was recovered in 81% yield by distillation under reduced pressure.

Sodium hydride (1 mole) was suspended in refined kerosene (118 cc.) and heated to 130–140° C. Tung oil methyl ester, prepared as described above, was added slowly with agitation. After 3¼ hours, during which the calculated quantity of hydrogen was evolved, the mixture was cooled and acidified below 50° with 24% aqueous hydrochloric acid. The resulting oil was washed with water until neutral, after which the kerosene and remaining traces of water were removed by distillation at 1–2 mm. A film of the product containing 0.1% of cobalt drier, dried in ten minutes when exposed to the air at 20–25° C. A similar film without drier dried in 7–8 minutes at 100° C.

EXAMPLE 2

Tung oil methyl ester was condensed with a suspension of sodium hydride in kerosene, as described in Example 1. The sodium derivative was then treated with a mixture of water and methanol, and heated 4–5 hours under reflux, during which time hydrolysis of the keto-ester occurred, with formation of sodium carbonate. The resulting ketone was washed with water, and the kerosene and suspended water removed by vacuum distillation. The product had drying properties similar to those described in Example 1.

EXAMPLE 3

Raw linseed oil was converted to a mixture of methyl esters by treatment with methanol, using hydrogen chloride as catalyst. The distilled product (296 g.) was heated for 6¾ hours at about 130° C. with a suspension of sodium hydride (1.05 mole) in refined kerosene (500 cc.); 95% of the theoretical volume of hydrogen was evolved. Glacial acetic acid (1.05 mole) was added, and the product washed with water until neutral. After removing the kerosene by vacuum distillation, the product was obtained as a still residue whose molecular weight was approximately 438. It was found to dry in 7¼ hours at 100° C. without drier, as compared with 3¾ hours for raw linseed oil.

EXAMPLE 4

Linseed oil methyl esters were prepared and condensed with sodium hydride as described in Example 3. The sodium derivative, without acidification, was treated with iodine (½ mole per mole of sodium hydride) for two hours, during which the sodium was converted to sodium iodide. The product was washed and freed of diluents as in previous examples, and was found to dry in 51 minutes at 100° C. without drier; its average molecular weight was approximately 711.

EXAMPLE 5

A mixture of methyl esters was prepared from soy bean oil and condensed with sodium hydride by the general method described in the foregoing examples. The resulting oil had a molecular weight of 447 and iodine number of 173. Its drying time at 100° without drier was over 24 hours.

Two-tenths mole of the above condensation product was converted to its sodium derivative by heating for 2¾ hours at 85–100° C. with 0.2 mole of sodium hydride in 130 cc. of refined kerosene; 0.17 mole of hydrogen was evolved. Methallyl chloride ($CH_2$=$C(CH_3).CH_2Cl$, 0.2 mole) was added and the mixture heated for 15–16 hours at 105°. Neutralization was completed with acetic acid, the product washed with water and kerosene removed by vacuum distillation. The residue had an iodine number of 220, and dried in 19–20 hours at 100° without drier.

EXAMPLE 6

A mixture of methyl esters was prepared from soy bean oil and condensed with sodium hydride by the general method described in the foregoing examples. The crude sodium derivative was treated with hydrogen chloride gas equivalent to half the sodium hydride used, and the methanol thus formed removed by vacuum distillation. The residue was heated under pressure for 2–3 hours at 150–160° with methylene chloride in 10% excess over the calculated quantity. After washing and distilling off volatile constituents, a residue was obtained which dried in 6½–7 hours at 100° without drier.

EXAMPLE 7

Crude menhaden oil (1 gal.) was mixed with 1 gal. of methanol containing 1 mole of sodium methylate. The mixture was refluxed overnight, then neutralized with dry hydrogen chloride. The methanol was distilled off, and the esters washed with water until free of chloride, then fractionally distilled at 2 mm. pressure. The following cuts were obtained:

| | | Grams |
|---|---|---|
| (1) | 135–160° | 1222 |
| (2) | 160–164° | 539 |
| (3) | 164–174° | 550 |
| (4) | 174–210° | 1059 |

Following the general procedure described in Example 3, condensation products were prepared from the menhaden methyl esters as follows: (a) a sample representative of the entire range; (b) a sample corresponding to a mixture of cuts (3) and (4); (c) a sample representing the highest boiling 14%. When mixed with about 0.5% cobalt drier, the condensation products dried at room temperature as follows: (a) 17–22 min.; (b) 9–12 min.; (c) 9–10 min.

EXAMPLE 8

A mixture of methyl esters, prepared from sardine oil by alcoholysis with methanol, was fractionally distilled and yielded a high-boiling fraction with an iodine number of approximately 250. Eighty grams of this material was mixed with 150 cc. toluene and 0.14 mole sodium methylate, dissolved in 45 cc. methanol. The mixture was heated at 105–125° C. for 10 hours, during which treatment the toluene and methanol distilled off. The product was acidified with hydrochloric acid, washed with water and dried over calcium chloride. A film of the resulting oil, containing about 0.1% cobalt drier, dried in 25–30 minutes.

EXAMPLE 9

A sample of sardine oil esters as used in Example 8 was condensed with sodium hydride as described in previous examples. The resulting oil had a molecular weight of 555, and dried at the same rate as the product of Example 8.

EXAMPLE 10

The product of Example 7 (b) (5 g.) was mixed with a solution of potassium hydroxide (2 g.) in methanol (40 cc.) and heated under reflux for 5–6 hours, during which time a precipitate of potassium carbonate was formed. The product was acidified, washed, and dried, and was found to dry at approximately the same rate as the starting material.

EXAMPLE 11

Comparative drying tests were run on natural drying oils and mixtures of these with the synthetic products prepared according to the foregoing examples. In each case approximately 0.1% of cobalt (as cobalt naphthenate) was added and the oil exposed to air at 20–25° C. in a thin film on a glass plate. Comparative toughness was determined approximately by rubbing the thoroughly dried films with an eraser under uniform pressure, and counting the number of strokes required to wear through the film. Typical results are shown in Table I.

Table I

| Oil | Drying time | Toughness |
| --- | --- | --- |
| Tung oil 100% | 2¼ hours | 25–30 strokes. |
| Linseed oil 100% | 2 hours | 7 strokes. |
| Soy bean oil 100% | 3½ hours | 3 strokes. |
| Mixture of soy bean oil 90% and product of Example 7 (c) 10% | 1¼ hours | 8 strokes. |
| Mixture of soy bean oil 80% and product of Example 7 (c) 20% | 48 minutes | 25–30 strokes. |
| Mixture of linseed oil 60% and product of Example 7 (b) 40% | 30 minutes | 12 strokes. |
| Mixture of tung oil 90% and product of Example 7 (c) 10% | 26 minutes | 50 strokes. |

The condensation products produced in accordance with our invention are believed to be novel products. The prior art reveals no references to these unsaturated beta-keto-esters having at least one olefinic bond in the acid radical.

Many modifications may be made without departing from the scope of our invention. For instance, the condensation may be carried out in the presence of solvents such as ethers or inert hydrocarbons. Drying accelerators other than cobalt naphthenate may be utilized in our novel compositions. For example, manganese, lead, zinc, or iron linoleates or resinates or mixtures of these may be used. Various other modifications will be apparent to those skilled in the art.

The novel compositions produced in accordance with our invention may be utilized in the synthesis of various organic compounds. However, such compositions are particularly useful as drying compositions in the production of materials in which rapid drying properties are desirable such as paint, varnish, or printing inks. In the case of our superior drying compositions many new and useful applications will be readily apparent. For instance, such drying compositions when added to ordinary drying oils such as linseed or tung oil increase the drying rates of the natural drying oil and impart added toughness to the film formed.

These superior drying compositions of our invention possess surprising advantages over the commonly used drying oils. Our novel compositions possess extremely hort drying times. For instance, some of these compositions dry in ten minutes as compared to two or three hours for conventional drying oils. Another and surprising advantage of our novel drying compositions is the degree of improvement in drying rates and film toughness obtained when these are mixed with relatively slow drying oils. Furthermore, unlike the ordinary ester type drying oils the compositions of our invention do not form non-drying products on saponification.

In the foregoing specification and following claims the novel compositions of our invention are referred to as unsaturated beta-keto esters since it is believed that the condensation products obtained by the condensation of an ester of an aliphatic acid and a monohydric alcohol having at least one olefinic bond in the acid radical with an ester of an aliphatic acid and a monohydric alcohol when at least one of said esters has at least two hydrogen atoms on the carbon adjacent the carbonyl group conform to the structure of such esters.

In the ensuing claims wherever the term "oxidation" is used the meaning intended is that which conforms to the usual construction of the term in the drying oil art as illustrated by references to the drying of linseed oil by oxidation.

Throughout the claims, "aliphatic carbon chain" denotes the methyl radical as well as a carbon chain containing two or more carbon atoms.

We claim:

1. A drying composition comprising an unsaturated beta-keto-ester having the general formula $RCOCHR_2COOR_1$ wherein R and $R_2$ are radicals selected from the group consisting of hydrogen and an aliphatic carbon chain and in which at least one of said radicals contains at least one olefinic bond and $R_1$ is an organic radical derived from a monohydric alcohol, and a material selected from the group consisting of natural drying oils, said composition tending to form resinous films on oxidation.

2. A drying composition comprising an unsaturated beta-keto ester having the general formula $RCOCHR_2COOR_1$ wherein R and $R_2$ are radicals selected from the group consisting of hydrogen and an aliphatic carbon chain and in which at least one of said radicals contains at least one olefinic bond and R₁ is an organic radical derived from a monohydric alcohol, and a material selected from the group consisting of natural drying oils, and a drying accelerator, said composition tending to form resinous films on oxidation.

3. A drying composition comprising an unsaturated beta-keto-ester having the general formula $RCOCHR_2COOR_1$ wherein R and R₂ are radicals selected from the group consisting of hydrogen and an aliphatic carbon chain and in which at least one of said radicals contains at least one olefinic bond and R₁ is an organic radical derived from a monohydric alcohol, and a drying accelerator, said composition tending to form resinous films on oxidation.

4. A drying composition comprising an unsaturated beta-keto-ester having the general formula $RCOCHR_2COOR_1$ wherein R and R₂ are radicals selected from the group consisting of hydrogen and an aliphatic carbon chain and in which at least one of said radicals contains at least one olefinic bond and R₁ is an organic radical derived from a monohydric alcohol, and sardine oil, said composition tending to form resinous films on oxidation.

5. A drying composition comprising an unsaturated beta-keto-ester having the general formula $RCOCHR_2COOR_1$ wherein R and R₂ are radicals selected from the group consisting of hydrogen and an aliphatic carbon chain and in which at least one of said radicals contains at least one olefinic bond and R₁ is an organic radical derived from a monohydric alcohol, and linseed oil, said composition tending to form resinous films on oxidation.

6. A drying composition comprising an unsaturated beta-keto-ester having the general formula $RCOCHR_2COOR_1$ wherein R and R₂ are radicals selected from the group consisting of hydrogen and an aliphatic carbon chain and in which at least one of said radicals contains at least one olefinic bond and R₁ is an organic radical derived from a monohydric alcohol, and soy bean oil, said composition tending to form resinous films on oxidation.

7. A drying composition comprising a ketone obtainable by ketonic hydrolysis of an unsaturated beta-keto-ester having the general formula $RCOCHR_2COOR_1$ wherein R and R₂ are radicals selected from the group consisting of hydrogen and an aliphatic carbon chain and in which at least one of said radicals contains at least one olefinic bond and R₁ is an organic radical derived from a monohydric alcohol, and a drying accelerator, said product tending to form resinous films on oxidation.

8. A drying composition comprising a ketone obtainable by ketonic hydrolysis of an unsaturated beta-keto-ester having the general formula $RCOCHR_2COOR_1$ wherein R and R₂ are radicals selected from the group consisting of hydrogen and an aliphatic carbon chain and in which at least one of said radicals contains at least one olefinic bond and R₁ is an organic radical derived from a monohydric alcohol, and a material selected from the group consisting of natural drying oils, said composition tending to form resinous films on oxidation.

9. A drying composition comprising a ketone obtainable by ketonic hydrolysis of an unsaturated beta-keto-ester having the general formula $RCOCHR_2COOR_1$ wherein R and R₂ are radicals selected from the group consisting of hydrogen and an aliphatic carbon chain and in which at least one of said radicals contains at least one olefinic bond and R₁ is an organic radical derived from a monohydric alcohol, and a material selected from the group consisting of natural drying oils, and a drying accelerator, said composition tending to form resinous films on oxidation.

10. The process for the production of drying compositions which comprises condensing an ester of an aliphatic acid and a monohydric alcohol having at least one olefinic bond in the acid radical with an ester of an aliphatic acid and a monohydric alcohol, at least one of said esters having at least two hydrogen atoms on the carbon atom adjacent the carbonyl group, in the presence of a suitable condensing agent.

11. The process for the production of drying compositions which comprises condensing, in the presence of a suitable condensing agent, esters of unsaturated acids and monohydric alcohols said esters being obtainable from tung oil.

12. The process for the production of drying compositions which comprises condensing, in the presence of a suitable condensing agent, esters of unsaturated acids and monohydric alcohols said esters being obtainable from menhaden oil.

13. The process for the production of drying compositions which comprises condensing, in the presence of a suitable condensing agent, esters of unsaturated acids and monohydric alcohols said esters being obtainable from sardine oil.

14. The process for the production of drying compositions which comprises condensing an ester of an aliphatic acid and a monohydric alcohol having at least one olefinic bond in the acid radical with an ester of an aliphatic acid and a monohydric alcohol, at least one of said esters having at least two hydrogen atoms on the carbon atom adjacent the carbonyl group in the presence of sodium hydride.

15. As a new composition of matter an unsaturated beta-keto-ester having the formula $RCOCHR_2COOR_1$ wherein R and R₂ are radicals selected from the group consisting of hydrogen and an aliphatic carbon chain and in which at least one of said radicals contains at least one olefinic bond and R₁ is an organic radical derived from a monohydric alcohol.

16. As a new composition of matter a condensation product of an ester of an aliphatic acid and a monohydric alcohol having at least one olefinic bond in the acid radical and an ester of an aliphatic acid and a monohydric alcohol at least one of said esters having at least two hydrogen atoms on the carbon atom adjacent the carbonyl group.

17. The process for the production of drying compositions which comprises condensing, in the presence of suitable condensing agents, esters of unsaturated acids and monohydric alcohols said esters being obtainable from the group consisting of tung oil, sardine oil, and menhaden oil, and said esters being characterized by a boiling range of substantially 135° C. to 210° C. at 2 mm. pressure.

18. A drying composition comprising a reaction product of the alkali metal derivative of a beta-keto-ester as defined by claim 15 and a halogen.

19. A drying composition comprising a reaction product of the alkali metal derivative of a beta-keto-ester as defined by claim 15 and an organic halogen compound.

20. A drying composition comprising a reaction product of the alkali metal derivative of a beta-keto-ester as defined by claim 15 and methallyl chloride.

21. A drying composition comprising a ketonic compound selected from the group consisting of an unsaturated beta-keto-ester having the general formula $RCOCHR_2COOR_1$ wherein R and $R_2$ are radicals selected from the group consisting of hydrogen and an aliphatic carbon chain and in which at least one of said radicals contains at least one olefinic bond and $R_1$ is an organic radical derived from a monohydric alcohol, a ketone obtainable by ketonic hydrolysis of said beta-keto-ester, and a reaction product of the alkali metal derivative of said beta-keto-ester with a material selected from the group consisting of a halogen and an organic halogen compound; and a material selected from the group consisting of natural drying oils, said composition tending to form resinous films on oxidation.

22. A drying composition comprising a ketonic compound selected from the group consisting of an unsaturated beta-keto-ester having the general formula $RCOCHR_2COOR_1$ wherein R and $R_2$ are radicals selected from the group consisting of hydrogen and an aliphatic carbon chain and in which at least one of said radicals contains at least one olefinic bond and $R_1$ is an organic radical derived from a monohydric alcohol, a ketone obtainable by ketonic hydrolysis of said beta-keto-ester, and a reaction product of the alkali metal derivative of said beta-keto-ester with a material selected from the group consisting of a halogen and an organic halogen compound; a material selected from the group consisting of natural drying oils, and a drying accelerator, said composition tending to form resinous films on oxidation.

23. A drying composition comprising a ketonic compound selected from the group consisting of an unsaturated beta-keto-ester having the general formula $RCOCHR_2COOR_1$ wherein R and $R_2$ are radicals selected from the group consisting of hydrogen and an aliphatic carbon chain and in which at least one of said radicals contains at least one olefinic bond and $R_1$ is an organic radical derived from a monohydric alcohol, a ketone obtainable by ketonic hydrolysis of said beta-keto-ester, and a reaction product of the alkali metal derivative of said beta-keto-ester with a material selected from the group consisting of a halogen and an organic halogen compound; and a drying accelerator, said composition tending to form resinous films on oxidation.

VIRGIL L. HANSLEY.
ARTHUR O. ROGERS.